(12) United States Patent
Medoro et al.

(10) Patent No.: US 11,286,891 B2
(45) Date of Patent: Mar. 29, 2022

(54) GROUP AND METHOD FOR UNCLOGGING A FILTER OF A PUMPING GROUP FOR PUMPING DIESEL TO AN INTERNAL COMBUSTION ENGINE

(71) Applicant: Robert Bosch GmbH, Stuttgart (DE)

(72) Inventors: Nello Medoro, Trinitapoli (IT); Pietro De Carlo, Bitritto (IT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/467,066

(22) PCT Filed: Dec. 1, 2017

(86) PCT No.: PCT/EP2017/081164
§ 371 (c)(1),
(2) Date: Jun. 6, 2019

(87) PCT Pub. No.: WO2018/104168
PCT Pub. Date: Jun. 14, 2018

(65) Prior Publication Data
US 2019/0383225 A1 Dec. 19, 2019

(30) Foreign Application Priority Data
Dec. 6, 2016 (IT) .................. 102016000123942

(51) Int. Cl.
*F02M 37/34* (2019.01)
*F02D 41/38* (2006.01)
(Continued)

(52) U.S. Cl.
CPC .......... *F02M 31/125* (2013.01); *B01D 35/005* (2013.01); *B01D 35/02* (2013.01);
(Continued)

(58) Field of Classification Search
CPC .......... F02D 2200/0606; F02D 2200/70; F02D 41/064; F02D 41/3827; F02D 41/3845;
(Continued)

(56) References Cited

U.S. PATENT DOCUMENTS

| 4,321,136 A | * | 3/1982 | Matsui | ................... B01D 35/14 210/86 |
| 4,539,108 A | * | 9/1985 | Izutani | ................... B01D 35/18 210/104 |

(Continued)

FOREIGN PATENT DOCUMENTS

| DE | 102010062455 | 6/2012 |
| DE | 102014211942 | * 12/2015 |

(Continued)

OTHER PUBLICATIONS

International Search Report for Application No. PCT/EP2017/081164 dated Jan. 4, 2018 (2 pages).

*Primary Examiner* — Phutthiwat Wongwian
*Assistant Examiner* — Diem T Tran
(74) *Attorney, Agent, or Firm* — Michael Best & Friedrich LLP

(57) ABSTRACT

Unclogging group for unclogging a filter of a pumping group for pumping diesel to an internal combustion engine, the unclogging group comprising: —a metering unit comprising an electromagnetic head and a control valve for controlling the diesel flow; —a filter associated with the control valve made at least in part of metallic material; —a temperature sensor for measuring the ambient temperature; —a control unit coupled to the temperature sensor; —an electrical circuit controlled by the control unit for supplying electrical current to the filter; wherein the control unit is configured so once received the starting input of the pumping group it compares the temperature measured by the temperature sensor with a threshold value, and if the tem- (Continued)

perature measured by the temperature sensor is less than the threshold value the control unit commands a delay of the starling of the pumping group of a period wherein the control unit supplies electrical current to the electrical circuit connected to the filter.

11 Claims, 1 Drawing Sheet

(51) Int. Cl.
*F02M 31/125* (2006.01)
*F02M 37/40* (2019.01)
*F02M 37/48* (2019.01)
*F02M 37/30* (2019.01)
*B01D 35/00* (2006.01)
*B01D 35/02* (2006.01)
*B01D 35/18* (2006.01)
*B01D 37/04* (2006.01)
*F02D 41/06* (2006.01)
*F02M 59/34* (2006.01)

(52) U.S. Cl.
CPC ........... *B01D 35/18* (2013.01); *B01D 37/048* (2013.01); *F02D 41/064* (2013.01); *F02D 41/3827* (2013.01); *F02D 41/3854* (2013.01); *F02M 37/30* (2019.01); *F02M 37/34* (2019.01); *F02M 37/40* (2019.01); *F02M 37/48* (2019.01); *F02M 59/34* (2013.01); *F02D 2200/0606* (2013.01); *F02D 2200/70* (2013.01)

(58) Field of Classification Search
CPC .. F02D 41/3854; F02M 31/125; F02M 37/30; F02M 37/34; F02M 37/40; F02M 37/48; F02M 59/34; Y02T 10/126
See application file for complete search history.

(56) References Cited

U.S. PATENT DOCUMENTS

| 6,332,441 | B1* | 12/2001 | Sugiyama | ................. F01L 1/02 123/195 C |
|---|---|---|---|---|
| 2006/0070956 | A1* | 4/2006 | Herrmann | ............ B01D 36/006 210/744 |

FOREIGN PATENT DOCUMENTS

| FR | 2657651 | 8/1991 |
|---|---|---|
| JP | S57156068 U | 9/1982 |
| JP | 04203468 | 7/1992 |
| JP | H10141178 A | 5/1998 |
| JP | 2000345818 A | 12/2000 |
| JP | 2008215332 A | 9/2008 |
| JP | 2012532280 A | 12/2012 |

* cited by examiner

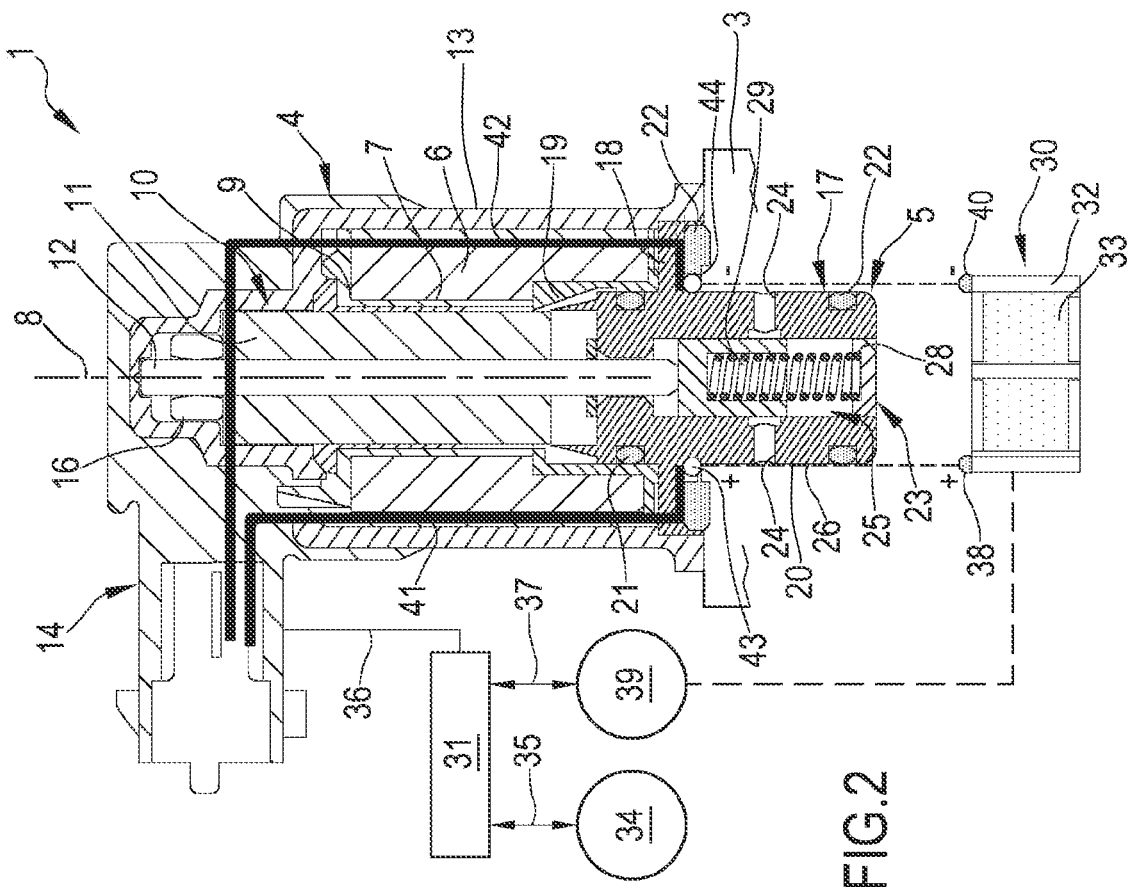
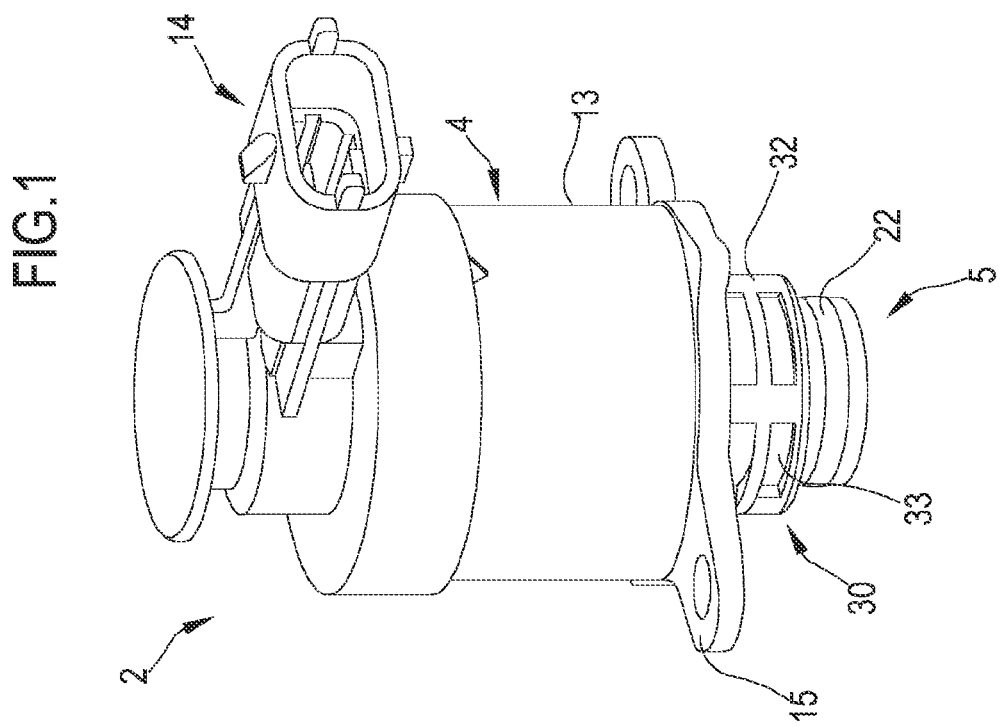

GROUP AND METHOD FOR UNCLOGGING A FILTER OF A PUMPING GROUP FOR PUMPING DIESEL TO AN INTERNAL COMBUSTION ENGINE

BACKGROUND OF THE INVENTION

The present invention relates to a group and to a method for unclogging, i.e. removing any clogging, a filter of a pumping group for pumping diesel to an internal combustion engine.

In particular, the present invention relates to a group and to a method for unclogging the filter associated with the metering unit, or throttle valve, arranged in the pumping group for pumping the diesel along the low pressure circuit between the low pressure pump and the high pressure pump.

As is known, when the temperature of the diesel drops beyond a specific threshold value, known in the field as "Cold Filter Plugging Point" or CFPP, the liquid diesel tends to slow down, generating a solid concentrate called paraffin which, when circulating in the pumping group, may clog the filtering devices provided along the circuit.

The CFPP threshold value precisely indicates the temperature at which the diesel no longer flows within a specific time inside a specific filter because it is excessively clogged by the paraffin.

The greatest problems linked to this phenomenon arise along the low pressure circuit of the pumping group, i.e. along the circuit which connects the low pressure pump, generally a gear pump, to the high pressure pump, generally a pump with pumping pistons, because it is in this section that the diesel may be at low temperatures linked to the temperatures of the external environment.

When using standard diesel, i.e. not "Arctic" diesel or diesel with added anti-freeze agents, during winter, there is a real risk of paraffin being deposited on the filters of the pumping group. When this paraffin deposit on the filters appears, the cold starting of the engine may become critical.

One filter which is particularly exposed to this risk is the filter associated with the throttle valve, which is arranged in the pumping group for pumping the diesel precisely along the low pressure circuit between the low pressure pump and the high pressure pump. When this filter becomes clogged with paraffin, a barrier is formed, preventing the diesel from being supplied to the intake valve, and it is therefore not possible to correctly turn on the engine.

Proceeding from this prior art, it is an object of the present invention to provide a group and a method for unclogging, i.e. removing any paraffin clogging, the filter associated with the metering unit, or throttle valve, arranged in the pumping group for pumping the diesel along the low pressure circuit between the low pressure pump and the high pressure pump.

SUMMARY OF THE INVENTION

The present invention provides a group comprising:
a metering unit, or throttle valve, provided with a control valve and with an electromagnetic head, wherein the metering unit is configured for receiving diesel from a low pressure pump and for feeding it in a controlled manner to a high pressure pump;
a filter associated with the control valve made at least in part of metallic material;
a temperature sensor for measuring the ambient temperature;
a control unit coupled to the temperature sensor;
an electrical circuit controlled by the control unit for supplying electrical current to the filter.

In particular, the control unit is configured so once received the starting input of the pumping group it compares the temperature measured by the temperature sensor with a threshold value, and if the temperature measured by the temperature sensor is less than the threshold value the control unit commands a delay of the starting of the pumping group of a period wherein the control unit supplies electrical current to the electrical circuit connected to the filter.

The method implemented by the group described above thus comprises the steps of:
sending the temperature measured by the temperature sensor to the control unit once the control unit has received the starting input of the pumping group;
comparing the temperature measured by the temperature sensor with the threshold value, generally the CFPP temperature of paraffin generation;
if the temperature measured by the temperature sensor is less than the threshold value, commanding a delay of the starting of the pumping group of a period and supplying electrical current to the electrical circuit connected to the filter for at least part of said period.

In this way, the Joule effect means that the metallic filter supplied with electrical current heats up, leading to the breaking up of any paraffin deposited owing to the ambient temperature being lower than the CFPP temperature.

In particular, the valve body comprises a first portion, arranged inside the electromagnetic head, and a second portion arranged outside the electromagnetic head and provided with side openings for the diesel flow. The filter is associated to the second portion of the valve body at the side openings and comprises a cage for supporting a grid or a net. The cage and/or the net are made of metal, and the section of the electrical circuit for supplying electrical current to the filter is embedded inside the electromagnetic head.

In this way, the section for supplying electrical current is protected as it is generally the electromagnetic head which is flange-mounted to the outside of the pump body.

In particular, the electrical circuit comprises a second section for discharging the electrical current which starts from the filter and is embedded inside the electromagnetic head.

In this way, the section for discharging the electrical current is protected as it is generally the electromagnetic head which is flange-mounted to the outside of the pump body.

In particular, the group comprises a temperature sensor for measuring the temperature of the filter, the temperature sensor being connected to the control unit so that the supply of the electrical current to the filter before the starting of the pumping group ends only when the temperature of the filter reaches a threshold value.

The method implemented by the variant described above thus comprises the steps of:
sending the temperature measured by the temperature sensor to the control unit during the preliminary supply of electrical current to the filter;
comparing the temperature measured by the temperature sensor with a threshold value, which may be the one at the start of electrical current supply or different;
if the temperature measured by the temperature sensor is greater than the threshold value, providing for an end to the preliminary supply of electrical current to the filter and starting the pumping group without further delay.

In this way, the preliminary supply of electrical current to the filter is interrupted only when it is certain that the desired result has been achieved, that is to say that the filter has heated up such as to dissolve any paraffin residues from condensation of the diesel.

Alternatively, the period for delaying the starting of the pumping group, and also the time of preliminary supply of electrical current to the filter, may be evaluated a priori, for example depending on the ambient temperature.

In this way, it is possible to achieve a good compromise in terms of dissolution of the paraffin and in terms of the waiting required by the user as a delay for starting the engine.

BRIEF DESCRIPTION OF THE DRAWINGS

Further features and advantages of the present invention will become clear from the following description of a non-limiting exemplary embodiment thereof, with reference to the figures of the accompanying drawings, in which:

FIG. 1 is a schematic perspective view of a metering unit, or throttle valve, which is provided with the respective filter and is arranged in the pumping group for pumping the diesel along the low pressure circuit between the low pressure pump and the high pressure pump;

FIG. 2 is a schematic view of the group for unclogging the filter according to the present invention, wherein the metering unit shown in FIG. 1 with the respective filter is schematized in section.

In the figures, reference numeral 1 denotes an embodiment of the group for unclogging a filter of a pumping group for pumping diesel to an internal combustion engine according to the present invention, with reference numeral 2 denoting the metering unit with which the filter to be unclogged is associated, and with reference numeral 30 denoting said filter.

DETAILED DESCRIPTION

The metering unit 2, or throttle valve, is part of a pumping group which collects diesel from a tank, supplies it in series to a low pressure gear pump and to a high pressure pump with pumping pistons, before conveying it toward a common tank connected to a series of injectors.

In particular, the metering unit 2 is arranged along the low pressure circuit, which connects the low pressure pump to the high pressure pump and has the task of controlling the supply of the high pressure pump.

To this end, the group 1 comprises a control unit 31 which is able to control the metering unit 2 as a function of signals received from sensors that can measure, in a known manner, various parameters linked to the operation of the engine. This control unit 31 can also be a control unit dedicated to command the starting of the engine, or can be connected to said starting control unit. In the rest of the description, reference will be made to the control unit 31 as the control unit which receives the starting signal, but could nevertheless, with regard to that mentioned above, also simply be a secondary control unit connected to the starting control unit.

In addition to having the function mentioned above, the metering unit 2 can also operate as an overflow device with the task of "draining", in use, the quantity of fuel which the low pressure pump supplies to the metering unit 2 which is surplus to the requirements of the high pressure pump, and of ensuring in this way that the pressure of the fuel at the inlet of the metering unit 2 is maintained consistently about a preset value.

As is shown schematically in the figures, the metering unit 2 is formed by an electrovalve, with at least one inlet side in communication with the outlet of the low pressure pump and at least one outlet side in communication with the inlet of the high pressure pump or with a discharge branch.

The metering unit 2 is flange-mounted on a supporting body 3, which is normally part of the body of the high pressure pump, and comprises an electromagnetic head 4 and a control valve 5. The electromagnetic head 4 comprises a coil 6, which is wound up onto a tubular body 7 made of nonmagnetic material and coaxial with an axis 8, a tubular bush 9 positioned inside the tubular body 7, and a movable core 10 made of magnetizable material. The core 10 is mounted so as to be axially slidable along the tubular bush 9, and comprises a tubular shank 11 and a sprag 12 which is integral with the tubular shank 11 and coaxial with the axis 8 and with the tubular bush 9. The electromagnetic head 4 furthermore comprises a closing cup 13, which bears, connected at one end, an electrical connector 14 for the supply of electrical current to the coil 6 and which is provided, at the opposite end, with an outer flange 15 for the connection of the metering unit 2 to the supporting body 3. On the inside of the closing cup 13, provision is made of a bearing 16 having the function of axially guiding the sprag 12 along the axis 8. The control valve 5 comprises a valve body 17 provided with an intermediate outer flange 18, which extends radially on the inside from the flange 15 into a position coaxial with the axis 8, is blocked by the closing cup 13 in contact with the supporting body 3, and defines, on the valve body 17, two opposing portions 19 and 20, which are substantially cylindrical and coaxial with the axis 8 and are arranged respectively on the outside and on the inside of the supporting body 3 or of the electromagnetic head 4.

In particular, the portion 19 extends from the flange 18 towards the movable core 10 inside the electromagnetic head 4 and is engaged sealingly, with the interposition of an O-ring 21, on the inside of the tubular body 7 in such a way as to define, together with the tubular bush 9 and with the closing cup 13, the housing and sliding seat for the movable core 10.

The portion 20 on the outside of the electromagnetic head 4 is engaged, with the interposition of two O-rings 22, on the inside of a cylindrical seat (not shown) formed in the supporting body 3, is coaxial with the axis 8, and communicates with a series of lower doors 23 and side doors 24 which function as inlets and outlets for the low pressure diesel.

In particular, the inside of the portion 20 of the valve body 17 is provided with a cavity 26, in which a movable shutter 27 can slide along the axis 8 between at least one raised position and at least one lowered position for controlling the flow of the low pressure diesel between the inlet and outlet doors 23, 24 of the valve body 17.

In particular, the cavity 26 forms a duct 25 which is open at the bottom at a lower door 23 and is connected to two side channels 24 substantially at half the height of the lower portion 20.

The valve 5 comprises a connector 28 coupled to the valve body 17 inside the cavity 26 at the lower inlet or door 23. The connector 28 is hollow and allows for passage of the fuel. The valve 5 comprises an elastic system 29, in particular a helical spring, which is interposed between the shutter 27 and the connector 28. The elastic system 29 exerts an axial force which presses the shutter 27 away from the lower inlet 23 and keeps the shutter 27 bearing against the sprag 22.

By supplying electrical current to the coil 6, what is generated is a magnetic field which, in interaction with the movable core 10, moves the shutter 27 as a result of the motion of the sprag 22, thereby controlling in a desired manner the flow of low pressure diesel between the inlets and the outlets of the valve body 17.

At at least one section of the portion 20 of the valve body 17, provision is made of a filter 30 arranged in a manner coupled, in a known manner, externally to the valve 5.

In particular, the filter 30 is externally coupled to the valve body 17 along a first section which extends from the flange 18 to the inside of the supporting body 3 and intercepts at least the side channels 24.

In the example illustrated, the filter 30 is in the form of a sleeve and comprises a cylindrical cage 32 which supports a filtering wall 33 in the form of a net or grid.

As can be seen in FIG. 2, the filter 30 is arranged with respect to the flange 18 on the opposite side with respect to the coil 6.

According to the invention, the apparatus for unclogging the filter 30 comprises a sensor 34 for measuring the external ambient temperature, which is connected to the control unit 31 by means of designated wiring cables or wirelessly.

This connection has been schematized in FIG. 2 with reference numeral 35. In particular, this sensor 34 is configured to send to the control unit 31, possibly on the request of said control unit 31, the measured or calculated value of the external ambient temperature at the instant at which the operator sends to the control unit 31, or to another control unit connected thereto as indicated above, the command for starting the engine and therefore the pumping group in which the metering unit 2 is installed.

Once it has received the required information relating to the ambient temperature from the sensor 34, the control unit 31 compares, possibly subject to processing, said temperature data with a reference temperature threshold value. This reference threshold temperature corresponds to or is a function of the CFPP transition temperature of the diesel from a liquid state to paraffin.

If the ambient temperature data is greater than said reference temperature threshold value, the control unit 31 sends the command for normal starting to the engine and consequently will command for the supply of electrical current to the coil 6 in a known manner depending on the required flow of diesel which has to pass from the valve 5.

If the ambient temperature data is less than said reference temperature threshold value, the control unit 31 does not send the normal starting signal to the engine, but commands for the supply of electrical current to an electrical circuit, schematized in FIG. 2 with the references 41 and 42, configured for supplying electrical current to the filter 30.

In particular, the control unit 31 therefore provides to delay the starting of the engine and to command the supply of electrical current, for example an electrical current having amperage more than 2 A, to the filter 30 for a predetermined period, before commanding the starting of the engine and of the systems connected thereto, including the pumping group for pumping the diesel, which collects the diesel from the tank and supplies it to the injectors. As mentioned above, this procedure for the preliminary supply of electrical current to the filter 30 before starting the pumping group is carried out when the ambient temperature measured by the sensor 34 is less than the temperature of transition of the diesel from a liquid state to paraffin, i.e. during what is termed "cold starting".

The filter 30 is made at least partially of metallic material. In particular, both the cage 32 and the net 33 may be made of metal.

By supplying electrical current to the metallic filter 30 before starting the pump, and generally the engine, the filter 30 is heated up by the Joule effect in such a way that any paraffin deposits which clog the net 33 are dissolved, allowing for the correct flow of diesel through the metering unit.

The duration of this preliminary supply of electrical current to the filter 30 may be a time which is fixed and defined a priori, or may be variable depending on a number of factors.

Factors which may influence the duration of the preliminary supply of electrical current to the filter 30 may be the differential between the temperature measured by the sensor 34 and the threshold value, or design parameters linked to the type of engine, or other parameters.

Alternatively, the duration of the preliminary supply of electrical current to the filter 30 may also not be defined a priori, but may be a function of parameters measured during the supply of electrical current so as to thereby optimize the process. Indeed, the filter 30 may be associated to a corresponding sensor 39 for measuring the temperature in such a way that the preliminary supply of electrical current to the filter 30 may be interrupted only when a determined temperature is reached.

The connection between said sensor 39 and the control unit 31 is schematized in FIG. 2 with reference numeral 37, and may comprise wiring or wireless data transmission.

Since the delay in starting with respect to the command issued by the user is of the order of a few seconds which are necessary to heat up the filter 30 by the Joule effect, this delay is to be considered acceptable by the user given the major advantages which arise therefrom.

In the exemplary embodiment illustrated, the circuit for supplying electrical current 41, 42 to the filter 30 comprises an electrical current supply section 41, which proceeds from the connector 14 and reaches the filter 30 by covering a complete path to the electromagnetic head 4 as far as an end 43 positioned below the flange 18 outside the electromagnetic head 4, where an edge 38 of the cage 32 of the filter 30 is arranged.

The circuit then comprises a second section for discharging the electrical current 42, which has an end 44 positioned below the flange 18 outside the electromagnetic head 4 at a contact point 40 with the cage 32 of the filter 30. This section of the circuit for discharging the electrical current 42 also extends inside the electromagnetic head 4 as far as the connector 14.

On the command of the control unit 31, the electrical current is therefore supplied to the connector 14 by a battery, or by equivalent means, in such a way as to flow firstly in the supply section 41 of the circuit, circulate in the filter 30, only in the cage 32 or also in the net 33, in order to then be discharged in the discharge section 42 of the circuit, which takes it back to the connector 14 where it is earthed or sent to further users.

It is evident that the group for unclogging a filter of a pumping group for pumping diesel to an internal combustion engine according to the present invention described here may be subject to modifications and variations without thereby departing from the scope of protection of the accompanying claims.

The invention claimed is:

1. An unclogging group for unclogging a filter of a pumping group for pumping diesel to an internal combustion engine, the unclogging group comprising:

a metering unit supplied by diesel from a low pressure pump and configured for feeding in a controlled manner the diesel to a high pressure pump; the metering unit comprising an electromagnetic head and a control valve for controlling a diesel flow;

a filter associated with the control valve and made at least in part of metallic material;

a temperature sensor for measuring an ambient temperature;

a control unit coupled to the temperature sensor; and an electrical circuit controlled by the control unit for supplying electrical current to the filter;

wherein the control unit is configured so once the control unit has received a starting input of the pumping group, the control unit compares the temperature measured by the temperature sensor with a threshold value, and if the temperature measured by the temperature sensor is less than the threshold value the control unit commands a delay of a starting of the pumping group of a period wherein the control unit supplies electrical current to the electrical circuit connected to the filter, and wherein the control valve comprises a valve body, the valve body comprises a first portion, arranged inside the electromagnetic head, and a second portion arranged outside the electromagnetic head and provided with side openings for the diesel flow; the filter being externally coupled with and surrounding the second portion of the valve body and intercepting at least the side openings, and the filter comprising a supporting cage and a grid or net; the cage and the entire grid or net being made of metallic material.

2. The group as claimed in claim 1, wherein the electrical circuit comprises a first section embedded inside the electromagnetic head and having an end connected to the filter.

3. The group as claimed in claim 2, wherein the electrical circuit comprises a second section embedded inside the electromagnetic head and having an end connected to the filter.

4. The group as claimed in claim 1, wherein the unclogging group comprises a second temperature sensor for measuring the temperature of the filter; the second temperature sensor being connected to the control unit so that a supply of the electrical current to the electrical circuit before the starting of the pumping group ends only when the temperature of the filter reaches a threshold value.

5. The group as claimed in claim 1, wherein the electrical circuit is configured for supplying electrical current having amperage more than 2 A.

6. The group as claimed in claim 1, wherein the second portion is generally cylindrical and the filter is annular.

7. A method for unclogging a filter of a pumping group for pumping diesel to an internal combustion engine, the method comprising the steps of:

a) providing:

a metering unit supplied by diesel from a low pressure pump and configured for feeding in a controlled manner the diesel to a high pressure pump; the metering unit comprising an electromagnetic head and a control valve for controlling the diesel flow, the control valve comprising a valve body, the valve body comprising a first portion, arranged inside the electromagnetic head, and a second portion arranged outside the electromagnetic head and provided with side openings for the diesel flow;

a filter associated with the control valve, the filter comprising a supporting cage and a grid or net, the supporting cage and the entire grid or net being made of metallic material, the filter being externally coupled with and surrounding the second portion of the valve body and intercepting at least the side openings;

a temperature sensor for measuring an ambient temperature;

a control unit coupled to the temperature sensor; and an electrical circuit controlled by the control unit for supplying electrical current to the filter;

b) sending the temperature measured by the temperature sensor to the control unit once the control unit has received a starting input of the pumping group;

c) comparing the temperature measured by the temperature sensor with a threshold value;

d) if the temperature measured by the temperature sensor is less than the threshold value, commanding a delay of the starting of the pumping group of a period and supplying electrical current to the electrical circuit connected to the filter for at least part of said period.

8. The method as claimed in claim 7, wherein the method comprises the step to calculate the delay period depending on the temperature measured by the temperature sensor.

9. The method as claimed in claim 7, wherein the method comprises the steps of:

e) providing a second temperature sensor for measuring the temperature of the filter;

f) sending the temperature measured by the second temperature sensor to the control unit during the preliminary supply of the electrical current to the filter;

g) comparing the temperature measured by the second temperature sensor with a threshold value; and f) if the temperature measured by the second temperature sensor is more than the threshold value, ending the supply of the electrical current to the electrical circuit connected to the filter.

10. The method as claimed in claim 9, wherein the threshold values of the steps c) and g) correspond.

11. The method as claimed in claim 7, wherein the second portion is generally cylindrical and the filter is annular.

* * * * *